US006300625B1

(12) United States Patent
Ishihara

(10) Patent No.: US 6,300,625 B1
(45) Date of Patent: Oct. 9, 2001

(54) TIME-OF-FLIGHT MASS SPECTROMETER

(75) Inventor: Morio Ishihara, Osaka (JP)

(73) Assignee: Jeol, Ltd., Tokyo (JP)

(*) Notice: Subject to any disclaimer, the term of this patent is extended or adjusted under 35 U.S.C. 154(b) by 0 days.

(21) Appl. No.: 09/183,224

(22) Filed: Oct. 30, 1998

(30) Foreign Application Priority Data

Oct. 31, 1997 (JP) .................................................. 9-300257

(51) Int. Cl.[7] .......................... B01D 59/44; H01T 49/00

(52) U.S. Cl. ...................................... 250/287; 250/396 R

(58) Field of Search .............................. 250/287, 396 R; 315/500, 501, 502, 503, 504, 505

(56) References Cited

U.S. PATENT DOCUMENTS 4,754,135 * 6/1988 Jackson ................................ 250/287
4,774,408 * 9/1988 Gohlke ................................ 250/287
5,363,008 * 11/1994 Hiramoto et al. .................. 315/500
6,013,913 * 1/2000 Hanson ........................... 250/396 R

* cited by examiner

*Primary Examiner*—Bruce C. Anderson

(57) ABSTRACT

A small-sized, high-resolution, time-of-flight (TOF) mass spectrometer has a closed ion orbit formed by plural electric sectors. Ions can make plural revolutions in the closed orbit. An entrance path is formed in the closed orbit to introduce ions into the closed orbit. An exit path is formed in the closed orbit to take ions from the closed orbit. The entrance and exit paths can be formed at the exit and entrance of the electric sectors forming the closed orbit or can be positioned in the orbit between the electric sectors forming the closed orbit.

8 Claims, 3 Drawing Sheets

TIME-OF-FLIGHT MASS SPECTROMETER

FIELD OF THE INVENTION

The present invention relates to a time-of-flight (TOF) mass spectrometer having a closed orbit formed by plural.

BACKGROUND OF THE INVENTION

When ions are accelerated by an electric field, ions having smaller masses are more easily accelerated, while ions having greater masses are less easily accelerated. A time-of-flight (TOF) mass spectrometer is an instrument for performing mass analysis by measuring the differences in flight time (i.e., the time taken for ions to reach the ion detector) by making use of the principle described above.

In a TOF mass spectrometer, as the ion flight distance increases, ion mass differences tend to produce greater flight time differences. Therefore, one method of improving the resolution of the instrument is to increase the flight distance.

One known method for achieving both increase of flight distance and miniaturization of the instrument is to cause the direction of flight of ions to make a U-turn, using electric fields, for example.

SUMMARY OF THE INVENTION

In view of the foregoing, it is an object of the present invention to provide a time-of-flight (TOF) mass spectrometer having a closed orbit formed by plural. The flight distance is increased by knocking ions into and out of the closed orbit. At the same time, the instrument is made smaller.

This object is achieved by a TOF mass spectrometer comprising a closed orbit formed by plural, an entrance path for knocking ions into the closed orbit and an exit path for taking the ions from the closed orbit.

In one feature of the invention, electrodes producing the forming the closed orbit are provided with holes to permit the ions to enter and leave the closed orbit.

In another feature of the invention, auxiliary electric fields forming the entrance path and the exit path for the closed orbit are formed in a free flight space within the closed orbit.

In a further feature of the invention, the are switched off when the ions are knocked into and out of the closed orbit.

Other objects and features of the invention will appear in the course of the description thereof, which follows.

BRIEF DESCRIPTION OF THE DRAWINGS

FIGS. 1(*b*) and 1(*c*) are timing diagrams illustrating the timing at which electric fields within the TOF mass spectrometer shown in FIG. 2 are turned on and off;

DESCRIPTION OF THE PREFERRED EMBODIMENTS

Figure 2:
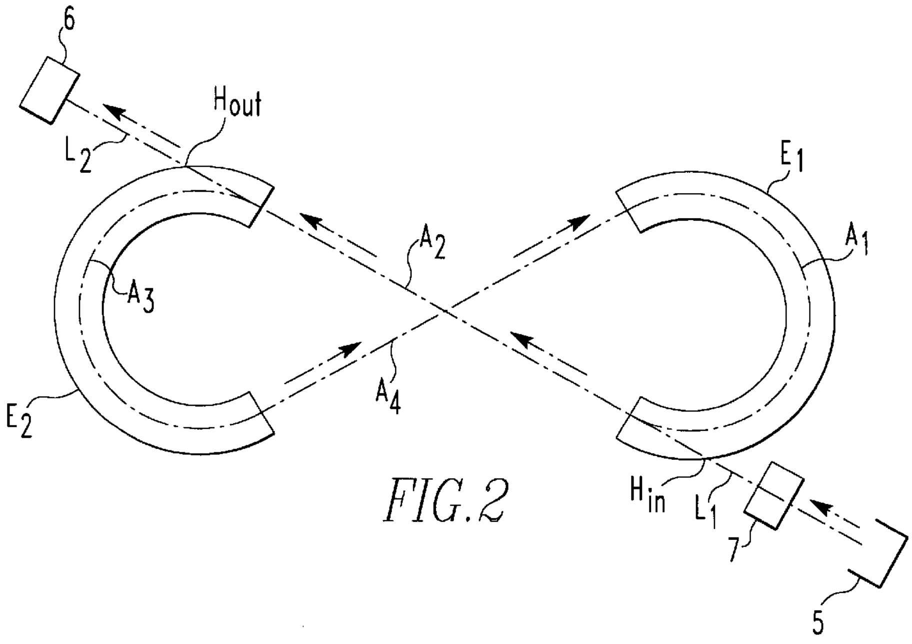
FIG. 2 is a schematic diagram of a TOF mass spectrometer in accordance with the present invention.

A time-of-flight (TOF) mass spectrometer in accordance with the present invention is shown in FIG. 2. This spectrometer has a closed ion orbit formed by circular paths $A_1$ and $A_3$ and straight paths $A_2$ and $A_4$. The circular paths $A_1$ and $A_3$ are within two electric sectors $E_1$ and $E_2$, respectively, which make deflection angles of greater than 180°. The straight paths $A_2$ and $A_4$ cross each other and connect the two circular paths $A_1$ and $A_3$. Ions are emitted as pulses from an ion source 5 and travel toward an ion detector 6. A gate 7 is mounted to pass only ions having a given range of velocities.

Ions going out of the gate 7 move straight in a path $L_1$ that is in agreement with the straight path $A_2$. A pair of electrodes produces the electric sector $E_1$. The outer one of these electrodes is provided with a hole $H_{in}$ near the exit of the electric field to prevent impediment to the movement of ions traveling in the path $L_1$. Therefore, the ions going out of the gate 7 can pass between these electrodes through the hole $H_{in}$ and travel in the straight path $A_2$.

An ion take-out hole $H_{out}$ is formed near the entrance of the electric sector $E_2$ developed by a pair of electrodes to extract ions from the closed orbit. This ion takeout hole $H_{out}$ is so located that ions traveling in the straight path $A_2$ would collide with the electrode forming the electric sector $E_2$ if they moved further straight. The ions going out of the electrodes through the ion takeout hole $H_{out}$ pass through the path $L_2$ into the ion detector 6, where they are detected.

Figure 1A:
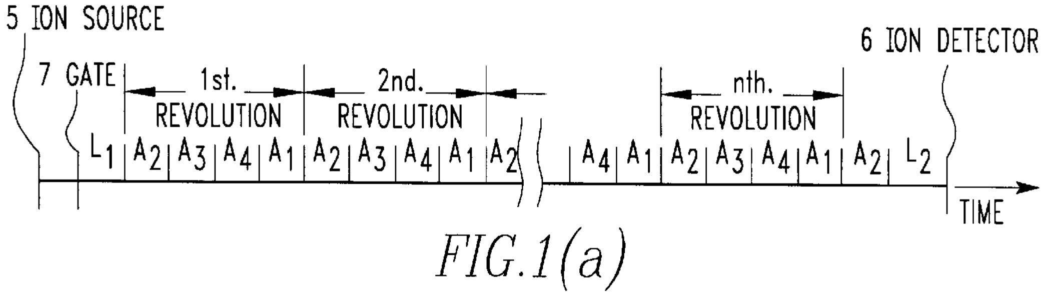
FIG. 1(*a*) is a diagram illustrating the paths that ions follow in a TOF mass spectrometer shown in FIG. 2, the spectrometer being built in accordance with the present invention.
Figure 1B:
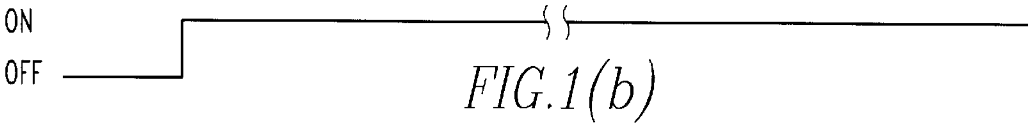
Figure 1C:
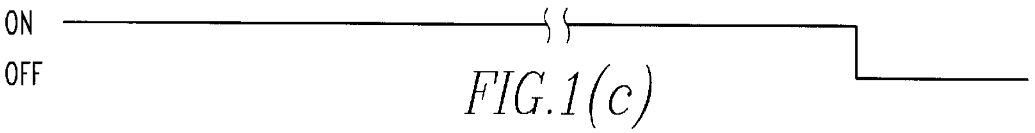

The operation of the instrument constructed in this way is next described by referring to FIGS. 1(*a*), 1(*b*) and 1(*c*). Pulsed ions enter the closed orbit and travel in this circular orbit. Then, the ions are taken from the closed orbit and reach the detector 6. FIG. 1(*a*) is a diagram illustrating these paths that the ions follow successively. FIG. 1(*b*) illustrates the timing at which the electric sector $E_1$ is turned on when the ions are admitted to the closed orbit. FIG. 1(*c*) illustrates the timing at which the electric sector $E_2$ is turned on when the ions are extracted from the closed orbit.

In FIG. 1(*a*), an assemblage of pulsed ions generated from the ion source 5 and passed through the gate 7 follows the path $L_1$ and enters the straight path $A_2$. When these ions are passing between the electrodes producing the electric sector $E_1$, this electric field is turned off (zero potential), as shown in FIG. 1(*b*), to prevent the ions from being deflected due to the electric sector $E_1$. After the ions of interest pass between the electrodes producing the electric sector $E_1$, this electric field is turned on before the ions again reach the electric sector $E_1$. Thus, an electric field of a given strength is produced. In this way, the ions are admitted to the closed orbit and travel in a figure-eight orbit formed by the paths $A_2$, $A_3$, $A_4$, $A_1$, $A_2$, and so on.

After the ions introduced in the closed orbit make a required number, n, of revolutions in the figure-eight orbit, the electric sector $E_2$ is turned off (zero potential), as shown in FIG. 1(*c*), to take the ions out of the closed orbit. Obviously, the field $E_2$ is turned off while the ions do not stay in the electric sector $E_2$. In particular, the ions are dispersed while traveling in the electric sector $E_2$. The electric sector $E_2$ is turned off between the instant when the last ones of these dispersed ions leave the electric sector $E_2$ and the instant when the forefront ions enter the sector $E_2$.

As a result, the ions making n revolutions in the closed orbit move straight without being deflected by the electric sector $E_2$. The ions are then taken out of the electrodes via the ion takeout hole $H_{out}$ and admitted to the ion detector 6, where they are detected.

Figure 3:
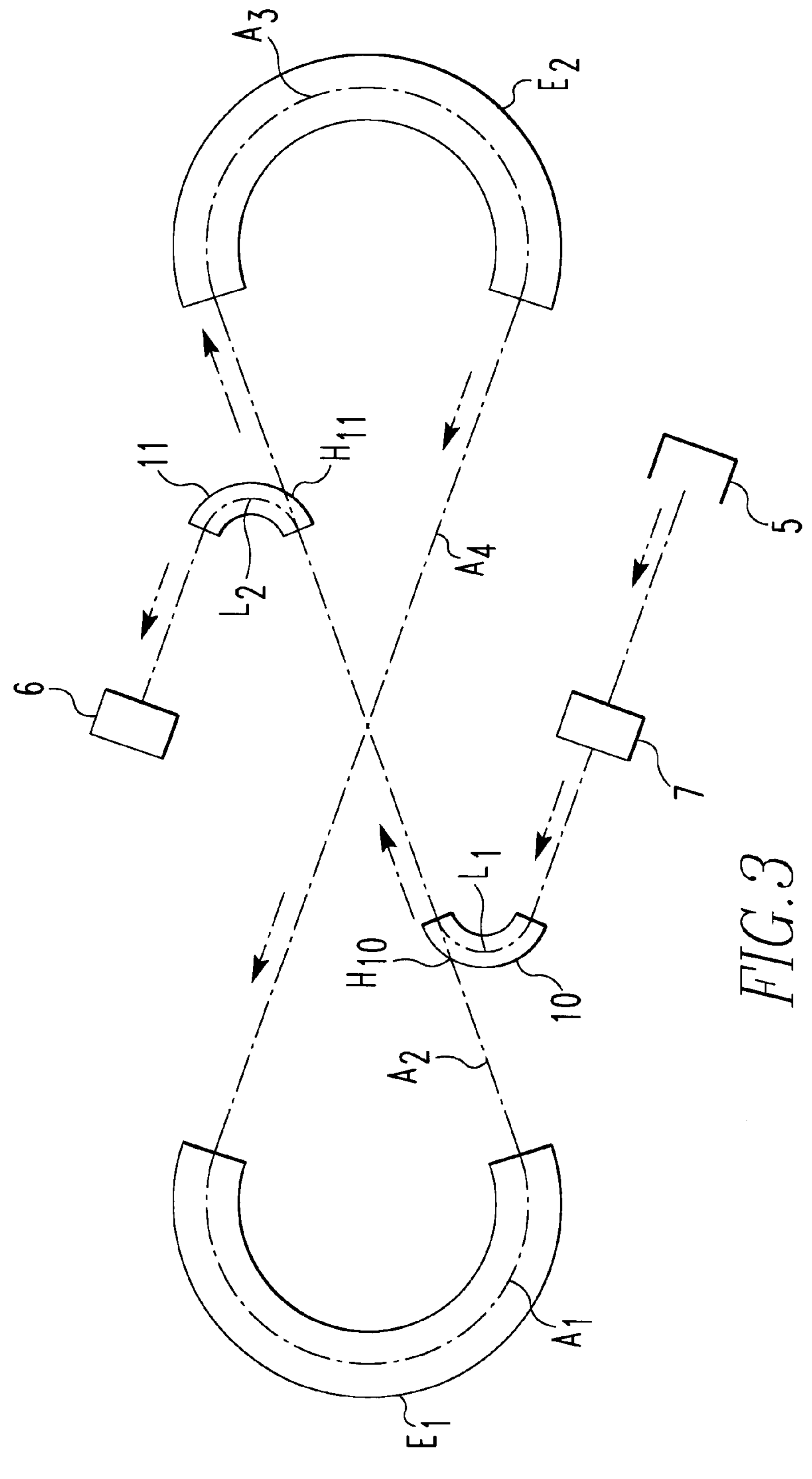
FIG. 3 is a schematic diagram of another TOF mass spectrometer in accordance with the present invention.

FIG. 3 shows another TOF mass spectrometer in accordance with the present invention. In this embodiment, an entrance path $L_1$ and an exit path $L_2$ are in a straight path $A_2$ connecting both electric sectors. An electric sector 10 for introducing ions and an electric sector 11 for extracting ions are added to bring the entrance path and the exit path into agreement with the straight path. The electric sectors 10 and 11 are turned on only during the introduction and departure of ions; the electric sectors 10 and 11 are kept off during the other interval. The electrodes forming the electric sectors 10 and 11 are provided with ion passage holes $H_{10}$ and $H_{11}$ to prevent impediment to the passage of the ions traveling in the closed orbit when the electric sectors are off.

Referring still to FIG. 3, the pulsed ions emitted from the ion source 5 pass through the gate 7 and enter the electric sector 10 forming the entrance path $L_1$. At this time, the electric sector 10 is ON and produces an electric field of a given strength. Consequently, the ions are deflected by the electric sector 10 and admitted to the straight path $A_2$. The ions begin to travel in the figure-eight orbit formed by the circular paths $A_1$, $A_3$ and the straight paths $A_2$, $A_4$.

The electric sector 10 is turned off (zero potential) until the ions again approach the electric sector 10. The ions can pass through the hole $H_{10}$ formed in the electrode producing the electric sector 10, and can keep revolving in the closed circular orbit.

When the ions introduced in the closed orbit finish the required number of revolutions, the electric sector 11 is turned on, thereby extracting the ions. Specifically, the electric sector 11 is turned on, and an electric field of a given strength is developed. The ions reaching the electric sector 11 are deflected by the electric sector 11, move in the exit path $L_2$, are extracted from the closed orbit, and reach the ion detector 6.

Figure 4:
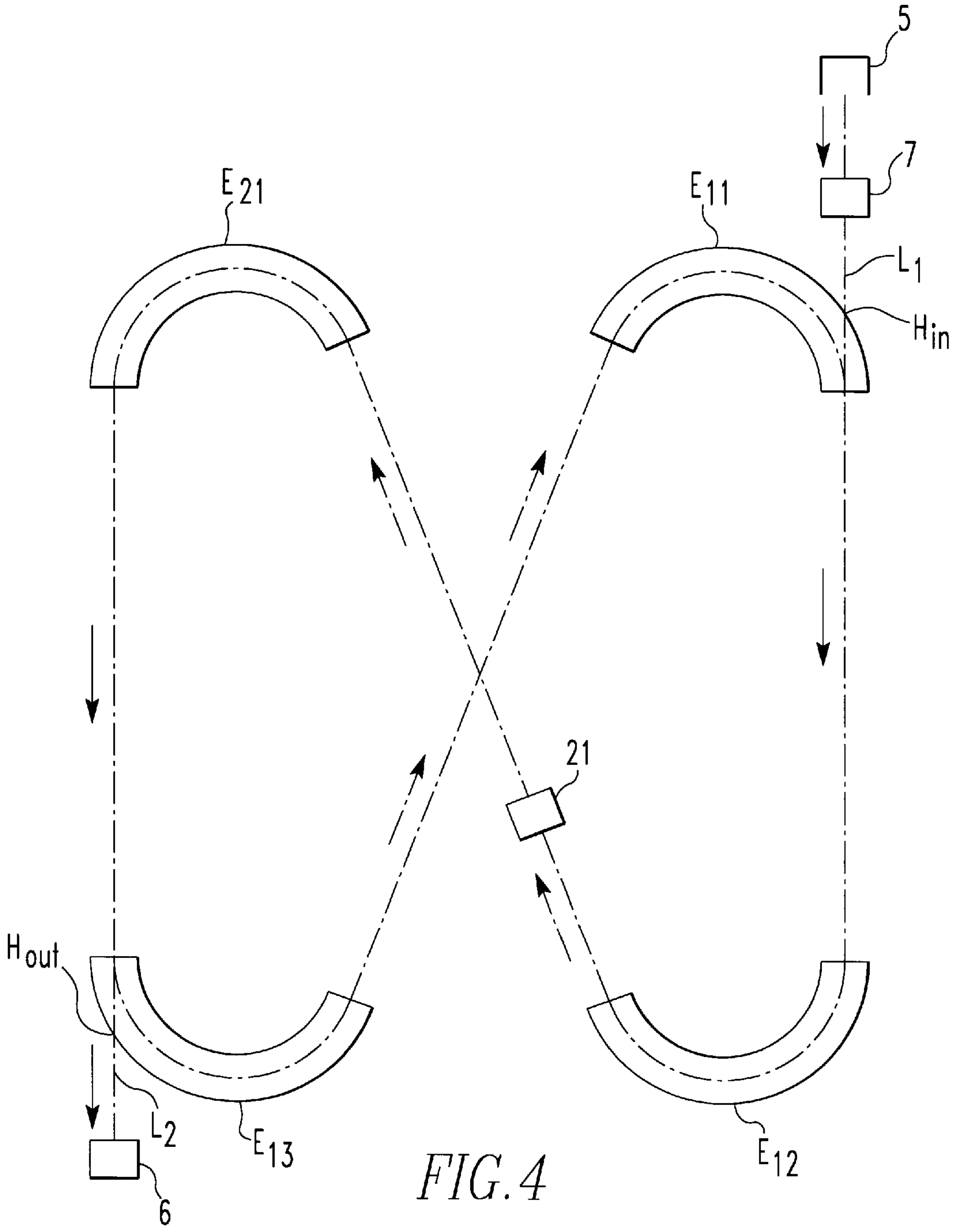
FIG. 4 is a schematic diagram of a further TOF mass spectrometer in accordance with the present invention.

FIG. 4 shows a further TOF mass spectrometer in accordance with the present invention. In the spectrometer shown in FIG. 2, electric sectors $E_1$ and $E_2$ are produced. In the spectrometer shown in FIG. 4, these electric sectors $E_1$ and $E_2$ are divided into electric sectors $E_{11}$, $E_{12}$ and $E_{21}$, $E_{22}$, respectively, having deflection angles of less than 180°. The closed orbit is formed by these four electric sectors. This increases the number of degrees of freedom in selecting electric sectors where the entrance path $L_1$ and the exit path $L_2$ are positioned.

In the present embodiment, a gate 21 is mounted in a straight path to prevent faster ions from outrunning slower ions. The gate 21 is not always essential to the present invention but useful in preventing this undesirable phenomenon while the ions are moving in the circular orbit; otherwise, the spectrum would be complicated.

In this way, the entrance and exit paths can be devised variously. A reflectron or any other device capable of constructing a TOF mass spectrometer may be included in the closed orbit. A quadrupole lens or einzel lens may be included in the closed orbit. Furthermore, any appropriate combination of them may be employed.

In the embodiments described above, the holes to pass the ions may be kept open if the electric fields are unaffected. However, if the electric fields are disturbed greatly, fine mesh may be attached to the holes. This minimizes disturbance of the electric fields while permitting passage of ions.

While three embodiments of the invention have been described in detail thus far, the minimum requirements of the present invention are as follows.

(1) There exists a closed orbit formed by plural electric sectors. Furthermore, there exist entrance and exit paths permitting ions to enter and leave the closed orbit. The entrance and exit paths are partially coincident with the closed orbit. Alternatively, the entrance and exit paths may be in contact with the closed orbit at least at one point.

(2) Where the entrance and exit paths intersect or overlap the closed orbit, holes are formed in the electrodes at the intersections.

(3) When ions are made to enter into or exit from the closed orbit, it is necessary at appropriate timing to turn off the electric sector that would otherwise impede the entry or exit of the ions.

A TOF mass spectrometer in accordance with the present invention has a closed orbit formed by plural electric sectors and a mechanism for forcing ions into and out of the closed orbit. Therefore, the number of revolutions that the ions make can be increased to thereby increase the flight distance, though the instrument is small. As a result, a small-sized, high-resolution TOF mass spectrometer can be accomplished.

Having thus described my invention with the detail and particularity required by the Patent Laws, what is desired protected by Letters Patent is set forth in the following claims.

What is claimed is:

1. A time-of-flight mass spectrometer comprising:

a) plural electric sectors defining a closed ion orbit formed;

b) means for knocking ions into said closed ion orbit from an entrance path connected with said closed ion orbit; and c) means for taking the ions from said closed ion orbit into an exit path connected with said closed ion orbit.

2. The time-of-flight mass spectrometer of claim 1, wherein said electric sectors are located opposite to each other and have deflection angles of greater than 180°.

3. The time-of-flight mass spectrometer of claim 1, wherein four electric sectors are spaced from each other and have deflection angles of less than 180°.

4. The time-of-flight mass spectrometer of claim 1, wherein electrodes producing said electric sectors forming the closed ion orbit are provided with holes to permit ions to enter and leave said closed ion orbit.

5. The time-of-flight mass spectrometer of claim 4, wherein said electric sectors include a first electric sector which has a hole permitting ions to be knocked into said closed ion orbit and which is turned off when the ions are knocked into said closed ion orbit, and wherein said electric sectors include a second electric sector which has a hole permitting ions to be taken out of said closed ion orbit and which is turned off when the ions are taken out of said closed ion orbit.

6. The time-of-flight mass spectrometer of claim 1, wherein said means for knocking ions into said closed orbit comprises a first auxiliary electric field for forming said entrance path on an ion path between said electric sectors and said means for taking ions from said closed orbit comprises a second auxiliary electric field for forming said exit path on an ion path between said electric sectors.

7. The time-of-flight mass spectrometer of claim 6, wherein electrodes for forming said auxiliary electric fields are provided with holes to permit passage of the ions rotating in said closed ion orbit.

8. The time-of-flight mass spectrometer of claim 6 or 7, wherein said first auxiliary electric field for forming said entrance path is turned on when ions are knocked into said closed ion orbit, and wherein said second auxiliary electric field for forming said exit path is turned on when the ions are taken from said closed ion orbit.

* * * * *

UNITED STATES PATENT AND TRADEMARK OFFICE

CERTIFICATE OF CORRECTION

PATENT NO. : 6,300,625 B1
DATED : October 9, 2001
INVENTOR(S) : Morio Ishihara

It is certified that error appears in the above-identified patent and that said Letters Patent is hereby corrected as shown below:

<u>Column 1,</u>
Line 5, "plural." should read -- plural sectors. --.
Line 28, "plural." should read -- plural sectors. --.
Line 33, "plural," should read -- plural sectors, --.
Line 37, after "producing the" insert -- sectors --.
Line 43, "the are" should read -- the sectors are --.

Signed and Sealed this

Nineteenth Day of March, 2002

*Attest:*

JAMES E. ROGAN
*Director of the United States Patent and Trademark Office*

*Attesting Officer*